United States Patent
Laurent-Chatenet et al.

(10) Patent No.: US 6,795,070 B1
(45) Date of Patent: Sep. 21, 2004

(54) METHOD FOR COMPRESSING AND ENCODING THREE-DIMENSIONAL MESHED NETWORK

(75) Inventors: Nathalie Laurent-Chatenet, Vignoc (FR); Patrick Lechat, Rennes (FR); Henri Sanson, Acigne (FR)

(73) Assignees: France Telecom (SA), Paris (FR); Telediffusion de France (SA), Paris (FR)

( * ) Notice: Subject to any disclaimer, the term of this patent is extended or adjusted under 35 U.S.C. 154(b) by 0 days.

(21) Appl. No.: 09/806,786

(22) PCT Filed: Sep. 30, 1999

(86) PCT No.: PCT/FR99/02323

§ 371 (c)(1),
(2), (4) Date: Jul. 2, 2001

(87) PCT Pub. No.: WO00/21035

PCT Pub. Date: Apr. 13, 2000

(30) Foreign Application Priority Data

Oct. 2, 1998 (FR) .............................................. 98 12525

(51) Int. Cl.[7] .............................................. G06T 17/20

(52) U.S. Cl. ...................... 345/423; 345/426; 345/582; 345/586

(58) Field of Search ................................. 345/420, 423, 345/426, 582, 586; 382/232, 199, 246, 268, 260

(56) References Cited

U.S. PATENT DOCUMENTS

| | | | | |
|---|---|---|---|---|
| 5,691,768 A | * | 11/1997 | Civanlar et al. | 375/240.01 |
| 6,208,997 B1 | * | 3/2001 | Sigeti et al. | 707/104.1 |
| 6,262,737 B1 | | 7/2001 | Li et al. | |
| 6,573,890 B1 | * | 6/2003 | Lengyel | 345/419 |

OTHER PUBLICATIONS

Li et al. "Progressive Coding of 3–D Graphic Models", Jun. 1998, IEEE USA, vol. 86, No. 6, pp. 1052–1063.
Salembier et al. "Very Low Bit Rate Video Coding Using Active Triangular Mesh" 1996 IEEE International Conference on Acoustics, Speech and Signal Processing—Proceedings (ICASSP) May 1996, vol. 4, pp. 2060–2063.
Wang et al. "Use of Two–Dimensional Deformable Mesh Structures for Video Coding, Part II—The Analysis Problem and a Region–Based Coder Employing an Active Mesh Representation", IEEE, Dec. 1996, vol. 6, No. 6, pp. 647–659.
Lee et al. "Non–Uniform Image Sampling and Interpolation Over Deformed Meshes and Its Hierarchical Extension", SPEI, May 1995, vol. 2501, pp. 389–400.
Lechat et al. "Image Approximation by Minimization of a Geometric Distance Applied to a 3D Finite Elements Based Model", IEEE Oct. 1997, vol. 2, pp. 724–727.

(List continued on next page.)

*Primary Examiner*—Mark Zimmerman
*Assistant Examiner*—Kimbinh T. Nguyen
(74) *Attorney, Agent, or Firm*—Patterson, Thuente, Skaar & Christensen, P.A.

(57) ABSTRACT

A method for encoding a digital image for producing a bit stream representing the image, the bit stream length depending on the quality of the desired representation, consisting in: a) defining, on the domain of the image to be encoded, a hierarchical meshing comprising a plurality of nested meshes whereof the mesh peaks are the image pixels; b) determining for each mesh of the hierarchical meshing, a brightness variation between the image to be encoded and an interpolated image obtained from the nested meshing peaks whereto pertains the mesh concerned; and c) inserting in the bit stream position, brightness and chrominance values of the peaks of meshes whereof the brightness variation is higher than a threshold variation useful for encoding fixed or animated images with speed reduction.

21 Claims, 3 Drawing Sheets

OTHER PUBLICATIONS

Labelle, "Computation of Image Representation Based on Active Triangular Meshes Through Geometrical Surface Evolution", Feb. 1997, SPIE, vol. 3024, pp. 843–854.

Lee et al, "Two–Dimensional Split and Merge Algorithm for Image Coding", May 1995, SPIE, Vo. 2501, pp. 694–704.

* cited by examiner

1110111000000011

METHOD FOR COMPRESSING AND ENCODING THREE-DIMENSIONAL MESHED NETWORK

BACKGROUND OF THE INVENTION

1. Field of the Invention

The present invention concerns the field of the coding of fixed or animated images with flowrate reduction (compression).

The techniques for compressing images are traditionally used to reduce the flowrate of video numerical signals so as to transmit or store them. The coding method put forward in the first application is particularly adapted to low flowrate transmissions and transmissions without any flowrate guarantee, such as those effected with the IP protocol (Internet Protocol).

2. Description of the Related Art

There are many methods for coding fixed or animated images with flowrate reduction, the most well-known being those having given rise to a standard, such as ISO-JPEG or ISO-MPEG.

These coding methods make use of general compression principles exploiting in fixed images (JPEG) the spatial redundancy inside an image, the correlations between adjacent points and the lower sensibility of the eye to fine details, and in animated images (MPEG) the temporal redundancy between successive images.

In this type of method, first of all the image undergoes a transformation by applying a Discrete Cosinus Transform (DCT) on blocks of the image or by applying a wavelets transform on the whole image. The resulting signal is then quantified so as to limit the number of possible values of the signal, then coded with the aid of an entropic coding using the statistical redundancies of the quantified signal so as to reduce the amount of data to be transmitted or stored.

However, these traditional methods have several limitations due mainly to the use of techniques not taking s account of the contents of the image and their purely numerical character:

ringings due to block effects in the case of the discrete cosinus transform appearing close to the contours of the image, these ringings also appearing in the case of low flowrate wavelets;

these techniques are poorly adapted to geometrical handlings (homothetic transformation, etc) which are traditionally used to determine the compensation of movement between two images in the case of animated images (MPEG) or to integrate synthetic images in natural scenes.

There are also methods acting directly in the spatial area of the image and consisting of generating a photometric surface characterising each chromatic component of the image by directly selecting pixels characteristic of the image, the obtaining of the other pixels of the image being effected via the interpolation of the characteristic pixels.

Although offering a large number of possibilities concerning geometrical handlings, these methods nevertheless prove to be extremely deceptive concerning compression. Moreover, they do not make it possible to obtain a volume of data at the end of coding which is adapted to the complexity of the image and the desired quality of representation contrary to the case with coding by wavelets. In particular, these methods do not make it possible to obtain an image with an acceptable quality, especially when the flowrate is weak.

In addition, there are coding methods using a hierarchical meshing comprising a plurality of nested meshings as described in the article entitled "Progressive coding of 3-D graphic models", proceedings of the IEEE, June 1998, IEEE, USA, vol. 86, n°6, pages 1052–1053. The method is based on a neighbourhood criterion and distinguishes non-essential edges coplanar with their neighbourhood, and the visually important edges, which are significantly different from their neighbourhood. The position values are coded considered as attributes of the edges. So as to limit the number of bits at the end of the coding method, the structure data of the meshing and the attributes of the tops of the meshing are coded by referring to tables.

OBJECTS AND SUMMARY OF THE INVENTION

One aim of the invention is to offer another coding method for mitigating said drawbacks.

The object of the invention is a method for coding a numerical image for producing a binary train representative of said image, the length of the binary train depending on the desired quality of representation, and is characterised in that it comprises the following steps:

a) defining on the area of the image to be coded a hierarchical meshing comprising a plurality of nested meshings whose mesh tops are pixels of said image;

b) determining for each mesh of said hierarchical meshing a luminance deviation between the image to be coded and an interpolated image obtained from the tops of the nested meshing to which the mesh in question belongs, and c) introducing into the binary train the position, luminance and chrominance values of the tops of the meshes whose luminance deviation is greater than a threshold deviation.

The hierarchical meshing is preferably obtained by regular and successive subdivisions of meshes of a meshing with a coarser base.

So as to more easily process the chrominance, luminance and position values of the tops of the meshes, the method of the invention advantageously comprises a step for embodying a tree structure associated with said hierarchical meshing.

According to one particular embodiment, step c) is repeated several times with increasingly weaker threshold deviations so as to generate on each iteration a group of bits for improving quality of representation.

So as to reduce the size of the binary train, the values to be introduced into the binary train firstly undergo a quantification and compression operation.

Finally, according to another particular embodiment, it is also possible to optimise the position of the tops of the multiple meshing and the associated chrominance and luminance values so as to further increase the quality of representation of the binary train.

BRIEF DESCRIPTION OF THE DRAWINGS

Other characteristics and advantages of the invention shall appear more readily from a reading of the following detailed description with reference to the accompanying figures.

DESCRIPTION OF THE PREFERRED EMBODIMENTS

In the continuation of the description, we are going to consider an image to be coded whose pixels are marked in the space by an abscissa x and an ordinate y. A luminance component Y and two chromatic components U and V are associated with each pixel. It would have also been possible to use instead of the components Y, U and V the calorimetric components RVB, HSV.

According to a first step a) of the method of the invention, first of all on the area of the image to be coded a hierarchical meshing is defined comprising a plurality of nested meshings. The tops of the meshes of said meshings are pixels of the image to be coded. This hierarchical meshing is obtained for example by regular successive subdivisions of the meshes of a meshing with a coarse base. It is to be noted that the term meshing "node" is not used to avoid any confusion with the nodes of the tree which shall be associated with said meshing.

Figure 1A:
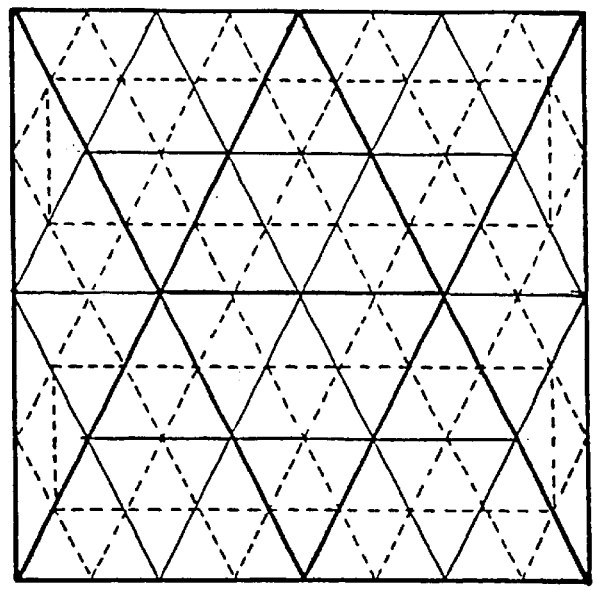
FIG. 1A shows a three-level multiple meshing.

An example of triangular hierarchical meshing comprising three nested meshings is illustrated on FIG. 1A. It comprises a basic meshing comprising 10 meshes and 8 mesh tops.

The basic meshing represented by the thick full line on FIG. 1A shows a regular staggered distribution of its mesh tops. A regular topology makes it possible to obtain a good distribution of the triangles on the image. This topology is most suitable when a priori the content of the image to be coded is not known. The triangles defined by this basic meshing correspond to level 0 triangles.

In the meshing example of FIG. 1A, the level 0 triangles are subdivided into four identical triangles, level 1. This subdivision is indicated by the fine full line on the figure.

Figure 1B:
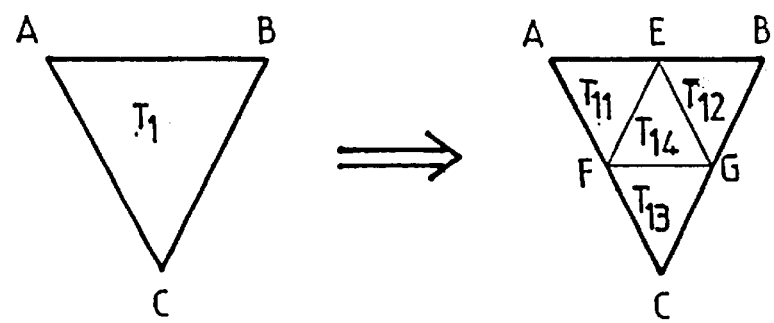
FIG. 1B shows the subdivision of a triangle T1 into four lower level triangles.

The subdivision of a father triangle $T_1$ into four son triangles with upper level $T_{11}, T_{12}, T_{13}, T_{14}$ is illustrated on FIG. 1B.

Finally, the level 1 triangles are subdivided into a four triangles, level 2. This new subdivision is represented by the dotted lines on FIG. 1A. This hierarchical meshing shall make it possible to represent the image with precision and thus a quality increasing proportionally to the number of nested meshings. Each nested meshing corresponds to one meshing level of the hierarchical meshing.

Certain mesh tops belong to several meshing levels, this being the case for example of the upper left pixel of the image which constitutes a triangle vertex for the three meshing levels. On the other hand, each triangle is linked to a sole meshing level (to a sole nested meshing). Each top of the meshing has a position in the mark of the image and is the centre of luminance Y and chrominance U, V information.

The generated meshing makes it possible to associate in meshing level one single triangle with each pixel of the image. An approximation of the luminance and chrominance values of the pixels of the image can be obtained via interpolation from the corresponding values of the vertices of the associated triangle.

The interpolation model used in the present description is the Lagrange model. It includes a refined basic function defined as follows:

$$\begin{cases} \begin{cases} \Psi_1^e(x,y) = \alpha_1^e + \beta_1^e x + \gamma_1^e y, & \alpha_1^e, \beta_1^e, \gamma_1^e \in \mathcal{R} \quad si(x,y) \in e \\ \sum_{l=i,j,k} \Psi_1^e(x,y) = 1 \end{cases} \\ \Psi_1^e(x,y) = 0 \qquad\qquad\qquad\qquad\qquad sinon \end{cases}$$

where e is a triangle with vertices i, j, k.

If the point of coordinates (x,y) is denoted by p and $\vec{v}(p)=(v_y, v_u, v_v)$ the vector containing the interpolated luminance $v_y$ and chrominance $v_u$ and $v_v$ values of the point p, the vector $\vec{v}(p)$ is then defined as follows:

$$\vec{v}(p) = \sum_{l=i,j,k} \Psi_1^e(p) \cdot \vec{v}(1)$$

In the present case (refined interpolation), the values $\Psi_i^e(x,y)$, $\Psi_j^e(x,y)$ and $\Psi_k^e(x,y)$ represent the barycentric coordinates of the point p in the triangle e. These coordinates are expressed as follows:

$$\Psi_i^e(x,y) = \frac{(x_j y_k - x_k y_j) + (y_j - y_k)x + (x_k - x_j)y}{x_j y_k - x_k y_j + x_k y_i - x_i y_k + x_i y_j - x_j y_i}$$

The $\Psi_j^e(x,y)$ and $\Psi_k^e(x,y)$ are obtained via the circular permutation of the indices i, j, k in the expression of $\Psi_i^e(x,y)$.

Figure 2:
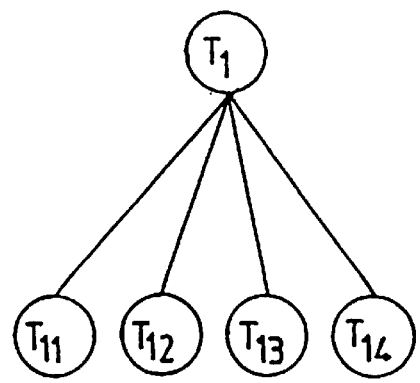
FIG. 2 shows the tree portion associated with the triangle T1 of FIG. 1B.

At the end of the meshing step, a tree structure is advantageously constructed associated with said hierarchical meshing so as to manipulate the values of the mesh tops. The tree comprises a number of levels equal to the number of meshing levels (or nested meshings). Each level of the tree has a number of nodes equal to the number of triangles in the corresponding meshing level. Each node of the tree relates to a single triangle of the hierarchical meshing. Thus, the portion of the tree relating to the triangle T, and its four son triangles $T_{11}, T_{12}, T_{13}, T_{14}$ is illustrated on FIG. 2. If the triangle $T_1$ belongs to the level n of the multiple meshing, a node is created corresponding to the level n of the tree and four son nodes to the level n+1 each relating to one of the son triangles $T_{11}, T_{12}, T_{13}, T_{14}$.

The vertices of the triangles $T_1, T_{11}, T_{12}, T_{13}$ and $T_{14}$ are respectively ABC, AEF, BEG, FGC and EFG. The node relating to the triangle $T_1$ shares the position, luminance and chrominance values of the vertices A, B and C with the other triangles having for a vertex one of the points A, B or C so as to avoid storing redundant values. Similarly, the values of the points E, F, G are distributed in the nodes relating to the triangles $T_{11}, T_{12}, T_{13}, T_{14}$.

Figure 3:
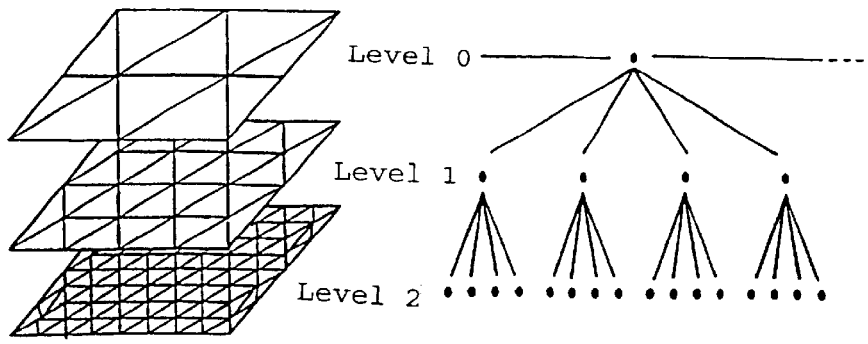
FIG. 3 shows the structure of the tree associated with the multiple meshing.

If in the same way one node is created for all the triangles of the hierarchical meshing, then a tree is obtained such as the one shown on FIG. 3, the root of said tree comprising a plurality of nodes equal in number to the number of triangles of the basic meshing.

Once the tree is constructed, it remains to determine the data of the tree to be introduced into the binary train representative of the image. This determination depends on the desired quality of representation. So as to carry out this determination, according to step b) for each triangle of the hierarchical meshing a luminance deviation is calculated between the image to be coded and the interpolated image obtained from the tops of the nested meshing to which the mesh in question belongs.

According to step c), this deviation is then compared with a threshold deviation for each triangle. The value of the threshold deviation depends on the desired quality of representation. Then introduced into the binary train is the portion of the tree relating to the triangles whose luminance deviation is greater than a threshold deviation.

Figure 4:
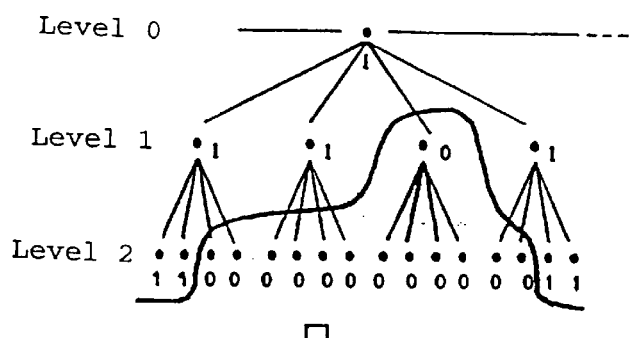
FIG. 4 shows the portion of the tree to be introduced into the binary train.

In practice, determination is carried out as follows for each node of the tree the luminance deviation of the associated triangle is calculated and then a value, 0 or 1 is added to them depending on whether the luminance deviation of the triangle associated with this node is smaller or greater than the threshold deviation. FIG. 4 illustrates this step. Introduced firstly into the binary train is a sequence enabling the decoder to reconstruct the portion of the tree introduced into the binary train, namely the sequence 11101110000000011 and then the values contained in the nodes having a 1 in the preceding sequence are introduced into the binary train.

Advantageously, the threshold diminishes in the course of the method so as to allow the coding to be graduated. Thus, according to a preferred embodiment, the step c) is repeated several times with increasingly smaller threshold deviations so as to generate on each iteration a supplementary group of bits for improving quality of representation. So as to construct a final binary train with no redundancies, a reference table is used in which associated with each node of the tree is a value 0 or 1 indicating if the values of the node in question have already been introduced into the bit train. The values of the table are updated as and when the values of the nodes are introduced into the bits train. Thus, when the threshold deviation diminishes, a check is made to see that the node values sought to be introduced into the bits train are not already there. This makes it possible to only introduce into the bits train the additional portion of the tree corresponding to lowering of the threshold deviation.

Thus, it is possible to only exploit the first portion of the binary train obtained with the highest threshold deviation when high quality of representation is not required. So as to obtain a quality of representation, it would be necessary to exploit a larger portion of the binary train.

According to an improved embodiment, it is possible to quantify and compress the values of the tops before introducing them into the binary train so as to limit the size of the latter. Quantification is preferably selected to be non-uniform. It may for example be based on the statistical distribution of the luminance values (respectively chrominance and position). In order to do this, the histogram of the luminance values (levels of greys) of the image to be processed is modelised. This histogram is generally hardly extended and can be assimilated with a generalised Gaussian. After having calculated the average and standard deviation and fixing a number of irregular intervals, an optimum quantification value $V_i$ is calculated for each interval $I_i$. This value is obtained by minimising a criterion D. The criterion D is defined as follows:

$$D = \sum_{i=1,\ldots,L} \int_{x \in I_i} (x - V_i)^2 p(x) dx$$

where p(x) denotes the marginal probability density of the point x obtained by the generalised Gaussian, L being the number of irregular intervals.

At the end of the quantification step, the quantified differential values are subjected to a data compression operation for limiting the length of the binary train. Advantageously compression is effected by an arithmetical and adaptive coder which in the present case has the best compression rates.

The general principle of arithmetical coding (or arithmetical compression) is the following: each message formed of symbols is represented by an interval of reals between 0 and 1. The higher there is the probability of the appearance of a symbol, the larger shall be its representation interval. Arithmetical coding is explained in more detail in the work entitled "Data compression" by Pascal Plumé published by Eyrolles, pp 111–168.

Furthermore, the adaptive coding consists of adapting the coding of a symbol according to its appearance frequency gradually during the compression step. Thus, if a symbol is coded on 5 bits at the start of compression. In another step of compression, this same symbol can be coded on 1 or 8 bits depending on whether its appearance frequency increases of reduces. At any moment of compression, the most frequent symbol is coded on the lowest number of bits. Of course, this technique requires that the portion of the coder for carrying out compression and that of the decoder for carrying out decompression function in parallel and homogenously. In this type of coding, the coder and decoder start with a given statistical table in which all the symbols are equiprobable. Gradually during compression, the coder updates the table. In fact the decoder does the same with its table during decompression. As long as the updating algorithm is identical in the coder and decoder, this type of coding functions perfectly without having to transmit any statistical table.

As the statistical distributions of the luminance, chrominance and position values differ from one another, it is preferable to separately code these Values. Also, the adaptive arithmetical coder is provided for processing these three value types separately.

So as to reduce the size of the binary train, according to one improved embodiment, it has been decided to not introduce into the binary train the exact luminance, chrominance and position values of the mesh tops of the nested meshings, apart from the base meshing, but differential values. Each differential value represents the difference between the exact associated value of the image to be coded and an interpolated value obtained from the corresponding exact values of the neighbouring tops of the lower hierarchical level nested meshing.

Figure 5:
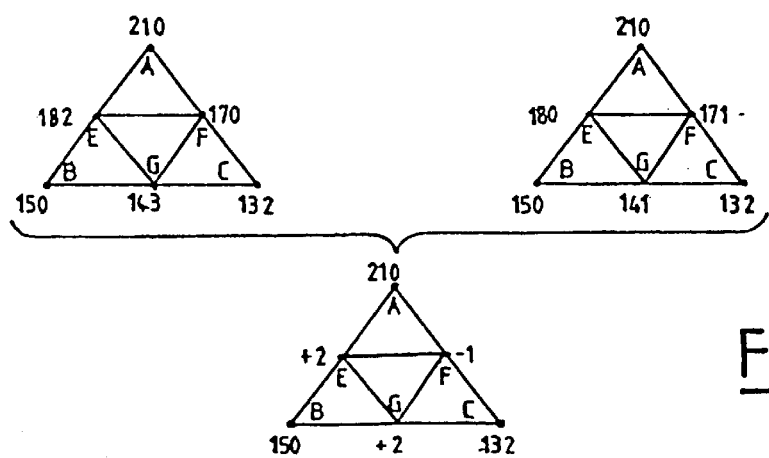
FIG. 5 illustrates the determination of the differential values to be introduced into the binary train after quantification.
Figure 6:
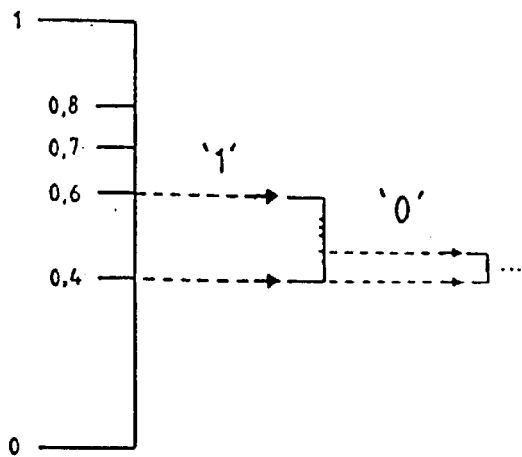
FIG. 6 shows an arithmetic compression operation.

An example for determining differential values is shown on FIG. 5. This shows a triangle, level 0, whose vertices A, B, C respectively have a luminance value of 210, 150 and 132. This triangle is subdivided into four identical triangles of level 1, thus making three new vertices E, F and G appear localised respectively in the middle of the sides AB, AC and BC of the level 0 triangle. The luminance values of the vertices E, F and G in the image to be coded are respectively 182, 170 and 143. If the luminance values of the vertices E, F and G are calculated by interpolating the values of adjacent vertices, the values 180, 171 and 141 are then obtained. The values introduced into the binary train are then +2, −1 and +2 corresponding to the difference between the exact values and the interpolated values. However, these values have been previously quantified so as to limit the number of possible values and thus improve the performances of the subsequent data compression operation.

Furthermore, so as to avoid cumulating quantification errors, calculation of the differential values is made from the lower level quantified values.

According to one preferred embodiment, the meshing (position and values Y, U, V of the tops) are also adapted to the contents of the image so as to exploit as fully as possible their coding potential. This adaptation can be made at three levels:

optimisation of the position of the tops of the meshing: the position of the nodes is modified according to their effectiveness to locally represent the image;

optimisation of the luminance and chrominance values of the tops of the meshing: the values Y, U, V are optimised so as to represent as fully as possible the original image;

optimisation of the topology of the meshing: the topology of the meshing is modified by using a diagonal inversion operation so as to further improve the capacity of the meshing to locally represent the image.

The previously selected meshing structure has a regular construction. Sometimes it may therefore seem ill-adapted to represent an image comprising disparities in its contents and mixing in particular uniform areas with more textured areas requiring higher density at the tops. An optimisation of the position of the tops of the meshing shall make it possible to move the concentrations of the meshing tops to those areas requiring it.

The most immediate visual effect of this optimisation is shown by bringing together the tops of the meshing towards the physical contours of the objects of the image.

Figure 7:
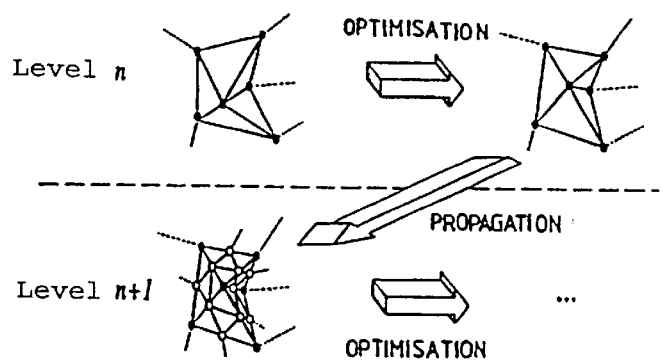
FIG. 7 shows an operation for optimising the position of the tops of a meshing level and its propagation at the upper meshing level.

This operation is carried out level by level starting with the level corresponding to the basic meshing (level 0). The result of the optimisation at level 0 is then transmitted to the level n+1 and the position of the additional tops of the level n+1 is obtained from the new position of the tops of level n. This optimisation of the position at each level and its propagation to the various levels of the tree are illustrated on, FIG. 7.

The position optimisation is carried out by minimising a criterion E corresponding to the luminance deviation between the image to be coded and the interpolated image. So as to calculate E, the points q of $\mathcal{R}^3$ with coordinates x, y and z with z=Y (luminance component). The criterion E is defined as follows:

$$E = \int_{\mathcal{R}^3} F(q) \, dq$$

where F is an indicating function worth 1 if q is between the surface formed from the points q of the original image and the surface formed from the points q of the interpolated image and 0, otherwise.

The minimisation of the deviation E is carried out using an adaptive step gradient descent algorithm. This involves finding the vector X of the points of $\mathcal{R}^3$ where E is minimal, that is:

$\nabla E(X)=0$

This boils down to resolving the following non-linear equations system:

$$\begin{cases} \frac{\partial E}{\partial x}(X) = 0 \\ \frac{\partial E}{\partial y}(X) = 0 \\ \frac{\partial E}{\partial z}(X) = 0 \end{cases}$$

It is possible to resolve this system directly by the Newton method. However, sometimes this method does not converge when the start point of the iterations is too distanced from the solution. Also, it is preferable to use iterative procedures resulting in producing a set of intermediate positions $q_1$, $q_2$ converging towards a local optimum of E.

This type of iterative procedure occurs as follows: so as to determine the optimal position of the top $S_o$, one commences with its start position $q_{SO}$ and the gradient of E is calculated at this point. As $\nabla E(q_{SO})$ indicates the direction of the greatest increase of E, the top with a quantity $\alpha_0$ is moved in the opposite direction and the top $S_0$ has for a new position $$q_1 = q_{S_0} - \alpha_0 * \frac{\nabla E(q_{S_0})}{|\nabla E(q_{S_0})|}$$

The repeated procedure generates the intermediate positions $q_2$, $q_3$, ... $q_k$ so that $$q_{k+1} = q_k - \alpha_k * \frac{\nabla E(q_k)}{|\nabla E(q_k)|}$$

An adaptive step $\alpha_k$ is advantageously selected so as to accelerate convergence. The adaptive step gradient descent method consists of reducing (respectively increasing) the step $\alpha_k$ when the deviation E increases (respectively reduces) whilst observing a size constraint on the step aiming at $\alpha_k \epsilon$. The final position $q_n = q_{S_0}$ is obtained when the difference between two successive deviations E is lower than a minimal threshold deviation. Similarly, a calculation is made of the optimal position of the other tops of the meshing.

As seen earlier, the deviation E is calculated with respect to the real image. According to an improved version, the deviation E is calculated at each meshing level with respect to a specific reference image I having similarities in terms of "frequential" content with the meshing level in question. Thus, with the basic meshing (level 0) only representing the low frequency aspect of an image, the reference image used for optimising the position of the tops of this level also has a low frequency "frequential" content. This reference image is obtained by filtering the real image.

Similarly, associated with each meshing level is a reference image whose "frequential" content is adapted to the meshing in question. The reference image associated with the highest meshing level corresponds to the real image (without filtering). So as to generate these reference images, an approximation of infinite pulse response half-band low-pass filters are used $$h(n) = \frac{\sin(\pi n/L)}{\pi n/L}$$

where L is a sub-sampling factor.

Thus, a different reference image is used at each meshing level so as to calculate the value E.

The optimisation of the luminance and chrominance values associated with the meshing tops constitutes another possible improvement of the method of the invention.

The optimisation of the values Y,U,V is effected by means of a least error squares method and consists of minimising a criterion E' defined on the area $\Omega$ of the image as follows:

$$E' = \int_\Omega \left| I(x, y) - \sum_{n=1}^{M} \Psi S_n(x, y) \cdot v(S_n) \right|^2 dxdy$$

where:
- $S_n$ is an index top n of the multiple meshing,
- M is the total number of tops of the multiple meshing,
- I (x,y) represents the luminance value (respectively the chrominance value U or V) of the pixel with coordinates (x,y) of the image to be coded,
- $\Psi S_n$ is the interpolation function associated with the top $S_n$,
- $V(S_n)$ is the optimised luminance (respectively chrominance) value associated with the top $S_n$.

If this expression is derived, the optimised values are obtained by resolving the following linear system of M equations:

$$\begin{cases} \sum_{n=1}^{M} \left( \int_\Omega \Psi S_1(x, y) \cdot \Psi S_n(x, y) \cdot dxdy \right) \cdot v(S_1) = \\ \qquad \int_\Omega I(x, y) \cdot \Psi S_1(x, y) \cdot dxdy \\ \vdots \\ \sum_{n=1}^{M} \left( \int_\Omega \Psi S_m(x, y) \cdot \Psi S_n(x, y) \cdot dxdy \right) \cdot v(S_m) = \\ \qquad \int_\Omega I(x, y) \cdot \Psi S_m(x, y) \cdot dxdy \\ \vdots \end{cases}$$

By means of the compact support of the function $\Psi S_m$, this system of equations can also be expressed as follows:

$$\begin{cases} \sum_{e \in supp(S_1)} \sum_{(x,y) \in e} \sum_{S_k \in ver(e)} \Psi S_1(x, y) \cdot \Psi S_k(x, y) \cdot v(S_1) = \\ \qquad \sum_{e \in supp(S_1)} \sum_{(x,y) \in e} I(x, y) \cdot \Psi S_1(x, y) \\ \vdots \\ \sum_{e \in supp(S_m)} \sum_{(x,y) \in e} \sum_{S_k \in ver(e)} \Psi S_m(x, y) \cdot \Psi S_k(x, y) \cdot v(S_m) = \\ \qquad \sum_{e \in supp(S_m)} \sum_{(x,y) \in e} I(x, y) \cdot \Psi S_m(x, y) \\ \vdots \end{cases} \quad (1)$$

where
- supp($S_m$) denotes the triangles or meshes whose top or vertex is the top $S_m$, and
- ver (e) denotes the vertices of the triangle e.

Resolving the preceding system of equations is equivalent to resolving a matrix system of the type:

$$AX=B$$

where:
- A is a defined positive symmetrical matrix,
- X is the column matrix of the optimised values $V(S_m)$ with m$\in$, and
- B is a column matrix of the values of the right-hand term of the system (1).

As the matrix A is a symmetrical matrix defined as positive, it has a sole $A=LDL^t$ factorisation, L denoting a lower triangular matrix with a unit diagonal and D a diagonal matrix having all the diagonal coefficients being strictly positive. The conditioning of the adjacent matrix A moreover has the unit value.

The determination of the coefficients of L and D can be made by identifying the coefficients situated in the lower triangular portion of the matrixes:

$$A_{i,j} = \sum_{k=1...M} L_{i,k} * D_k * L_{j,k} = \sum_{k=1...j} L_{i,k} * D_k * L_{j,k} \text{ pour } j \le i$$

Moreover, the following is obtained:

$$L_{i,j} = \left( A_{i,j} - \left( \sum_{k=1...j-1} L_{i,k} * D_k * L_{j,k} \right) \right) / D_j \text{ pour } 1 \le j \le i$$

$$D_i = A_{i,i} - \sum_{k=1...i-1} L_{i,k}^2 * D_k$$

The terms of the matrix X of the optimised values are then determined by the formula:

$$X_i = B_i - \sum_{j=1...i-1} X_j * L_{i,j}$$

According to one improved embodiment, it is possible to use the profile technique so as to resolve the AX=B system so as to limit the memory size during factorisation of A. The profile technique replaces the conventional representation of a matrix in the form of a table M x M by a representation in the form of two vectors. In fact, as the matrix A is hollow (it comprises a large number of zeros), its representation in a traditional form is inadequate.

According to a recent improvement, it is also possible to improve the topology of the meshing. In fact, the local structure of the meshing is not adapted to the particular characteristics of the image. Although it would be possible to refine the meshing until an adapted hierarchical meshing is obtained, it proves to be simpler to carry out a diagonal inversion operation.

This diagonal inversion operation is carried out on the last meshing level and consists of inverting the diagonal in the convex trapeziums formed of two adjacent triangles of said meshing level if the modified meshing offers better quality for reconstructing the image.

Figure 8A:
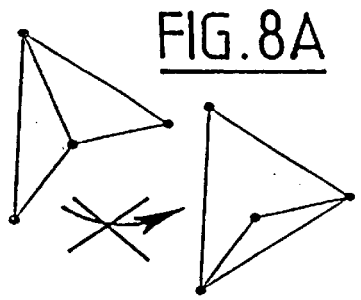
FIG. 8A illustrates a case where a diagonal inversion operation is excluded.

This diagonal inversion operation only concerns convex trapeziums. FIG. 8A shows a non-convex example of a trapezium for which the diagonal inversion operation is not permitted.

Figure 8B:
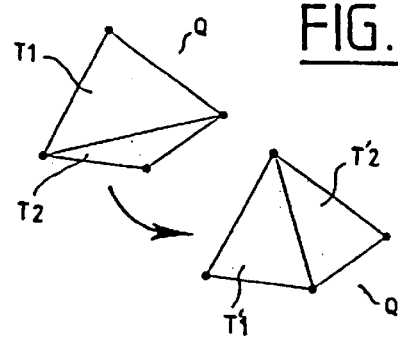
FIG. 8B illustrates a case where a diagonal inversion operation is possible.

A diagonal inversion operation on a convex trapezium Q formed of two triangles T1 and T2 is shown on FIG. 8B. This operation consists of inverting the diagonal representing the edge common to the two triangles T1 and T2. The trapezium Q then includes after inversion two new triangles T'1 and T'2.

The operation for optimising the topology then comprises the following steps:
- the luminance deviation E is calculated on each convex trapezium Q formed of two adjacent triangles T1, T2 of the highest meshing level, this luminance deviation being equal to the sum of the sums of the luminance deviations of T1 and T2, E(Q)=E (T1)+E (T2), the diagonal representing the edge common to the two triangles T1 and T2 is inverted so as to form two new triangles T'1 and T'2, the luminance deviation of the new triangles T'1 and T'2 is calculated and the E(Q)=E(T'1)+E(T'2) are added, and the two triangles in which the sum of the luminance deviations are the lowest are retained.

What is claimed is:

1. Method for coding a numerical image for producing a binary train representative of said image, the method comprising:

a) defining on an area of the image to be coded a hierarchical meshing comprising a plurality of nested meshings, each nested meshing corresponding to one meshing level of said hierarchical meshing wherein each level of nested meshing is obtained by successive subdivisions of said area into a plurality of meshes having mesh tops representative of pixels of said image;

b) determining for each mesh of said hierarchical meshing a luminance deviation between a corresponding pixel of the image to be coded and an interpolated value for the mesh in question obtained by interpolating luminance values of at least some of the mesh tops of the nested meshing to which the mesh in question belongs; and c) introducing into the binary train position, luminance and chrominance values of pixels corresponding to the mesh tops of the meshes whose luminance deviation is greater than a threshold deviation.

2. The method according to claim 1, wherein said hierarchical meshing is obtained by regular and successive subdivisions of meshes of a coarser base meshing level.

3. The method according to claim 2, wherein the base meshing level has a regular staggered distribution of mesh tops.

4. The method according to claim 1, further comprising: embodying a tree structure associated with said hierarchical meshing.

5. The method according to claim 1, wherein step c) is repeated a plurality of iterations with increasingly smaller threshold deviations so as to generate on each iteration a group of bits to be introduced into the binary train for improving a quality of representation of said image such that a length of the binary train depends on the quality of representation that is desired.

6. The method according to claim 1, wherein the position, luminance and chrominance values of the mesh tops of the meshes that are to be introduced into the binary train are subjected to a prior quantification operation.

7. The method according to claim 6, wherein said quantification operation is non-uniform.

8. The method according to claim 6, wherein said quantification operation generates quantified values that are subjected to a data compression operation before being introduced into the binary train.

9. The method according to claim 8, wherein said data compression operation is carried out by an adaptive arithmetical coder.

10. The method according to claim 2, wherein the luminance, chrominance and position values of the mesh tops of the nested meshings, apart from the values for the base meshing level that are introduced into the binary train, are "differential" values each representing the difference between the exact value of the corresponding pixel of the image to be coded and an interpolated value obtained from exact values of the corresponding pixels of the image to be coded of the neighboring mesh tops of the nested meshing of a lower hierarchical level meshing.

11. The method according to claim 1, wherein prior to step b), for each nested meshing of said hierarchical meshing, a position of the mesh tops of that nested meshing is optimized by minimizing the luminance deviation between the corresponding pixels of the image to be coded and the interpolated values determined from the mesh tops of that nested meshing.

12. The method according to claim 1, wherein prior to step b) a reference image is associated with each meshing of said hierarchical meshing, and, for each nested meshing, a position of the mesh tops of that nested meshing is optimized by minimizing the luminance deviation between the reference image associated with that nested meshing and the interpolated values determined from the mesh tops of that nested meshing.

13. The method according to claim 12, wherein the reference images associated with the various meshings of the hierarchical meshing are obtained by filtering the image to be coded.

14. The method according to claim 1, wherein the minimizing of the luminance deviation is effected by an adaptive step gradient descent algorithm.

15. Method for representing at least one numerical image, characterized in that the image is at least partially represented by a binary train generated according to claim 1.

16. Binary train structure representative of at least one numerical image wherein the image is coded according to the coding method according to claim 1.

17. Method for decoding a numerical image, comprising:
   decompressing the data of the binary train generated by the coding method of claim 9.

18. Method for coding a numerical image for producing a binary train representative of said image, the method comprising:

a) defining on an area of the image to be coded a hierarchical meshing comprising a plurality of nested meshings, each nested meshing corresponding to one meshing level of said hierarchical meshing wherein each level of nested meshing is obtained by successive subdivisions of said area into a plurality of meshes having mesh tops representative of pixels of said image;

b) optimizing luminance and chrominance values of the mesh tops of the meshes of each nested meshing by minimizing the following criterion E':

$$E' = \int_\Omega |I(x,y) - \sum_{n=1}^{M} \Psi S_n(x,y) \cdot v(S_n)|^2 \, dx dy$$

where:
   $S_n$ is an index mesh top n of said hierarchical meshing,
   M is the total number of mesh tops of said hierarchical meshing,
   I(x,y) represents a luminance value (respectively the chrominance value U or V) of a pixel with coordinates (x,y) of the image to be coded,
   $\psi S_n$ is an interpolation function associated with the mesh top $S_n$, and
   $V(S_n)$ is an optimized luminance value (respectively chrominance) associated with the mesh top $S_n$;

c) determining for each mesh of said hierarchical meshing a luminance deviation between a corresponding pixel of the image to be coded and an interpolated value for the mesh in question obtained by interpolating luminance values of at least some of the mesh tops of the nested meshing to which the mesh in question belongs; and d) introducing into the binary train position and the optimized luminance and chrominance values of pixels corresponding to the mesh tops of the meshes whose luminance deviation is greater than a threshold deviation.

19. The method according to claim 18, wherein the minimizing of the criterion E' is carried out by resolving the following linear system of M equations:

$$\begin{cases} \sum_{e \in supp(S_1)} \sum_{(x,y) \in e S_k} \sum_{\in vr(e)} \Psi S_1(x, y) \cdot \Psi S_k(x, y) \cdot v(S_1) = \\ \qquad \sum_{e \in supp(S_1)} \sum_{(x,y) \in e} I(x, y) \cdot \Psi S_1(x, y) \\ \vdots \\ \sum_{e \in supp(S_m)} \sum_{(x,y) \in e S_k} \sum_{\in vr(e)} \Psi S_m(x, y) \cdot \Psi S_k(x, y) \cdot v(S_m) = \\ \qquad \sum_{e \in supp(S_m)} \sum_{(x,y) \in e} I(x, y) \cdot \Psi S_m(x, y) \\ \vdots \end{cases} \quad (1)$$

where:

supp ($S_m$) denotes the meshes whose mesh top is $S_m$, and ver (e) denotes the mesh tops of the mesh e.

20. The method according to claim 19, wherein said linear system with M equations is resolved by a profile $LDL^t$ decomposition method.

21. Method for coding a numerical image for producing a binary train representative of said image, the method comprising:

a) defining on an area of the image to be coded a hierarchical meshing comprising a plurality of nested meshings, each nested meshing corresponding to one meshing level of the hierarchical meshing wherein each level of nested meshing of the hierarchical meshing is a triangular meshing, that is obtained by successive subdivisions of said area into a plurality of triangular meshes having mesh tops representative of pixels of said image;

b) prior to step c) performing the following:

b1) calculating for each convex trapezium formed of two adjacent triangles belonging to the highest meshing level of the hierarchical meshing a sum of the luminance deviations associated with the two triangles, b2) inverting a diagonal of the trapezium representing an edge common to the two triangles so as to define two new triangles, b3) calculating another sum of the luminance deviations associated with each of the two new triangles, and b4) retaining in said highest meshing the two triangles in which the sum of the luminance deviations is the lowest;

c) determining for each triangular mesh of said hierarchical meshing a luminance deviation between a corresponding pixel of the image to be coded and an interpolated value for the mesh in question obtained by interpolating luminance values of at least some of the mesh tops of the nested meshing to which the triangular mesh in question belongs; and d) introducing into the binary train position and the optimized luminance and chrominance values of pixels corresponding to the mesh tops of the triangular meshes whose luminance deviation is greater than a threshold deviation.

* * * * *